Nov. 28, 1967   R. H. VOUGHT ET AL   3,355,666
R.F. MEASURING DEVICE USING A SOLID STATE HEAT PUMP CALORIMETER
Filed Dec. 28, 1964                      2 Sheets-Sheet 1

Inventors:
Robert H. Vought,
Howard Kasch,
by Paul A. Frank
Their Attorney.

Inventors:
Robert H. Vought,
Howard Kasch,
by Paul A. Frank
Their Attorney.

United States Patent Office 3,355,666
Patented Nov. 28, 1967

3,355,666
R.F. MEASURING DEVICE USING A SOLID STATE HEAT PUMP CALORIMETER
Robert H. Vought, Schenectady, and Howard Kasch, Scotia, N.Y., assignors to General Electric Company, a corporation of New York
Filed Dec. 28, 1964, Ser. No. 421,413
20 Claims. (Cl. 324—106)

ABSTRACT OF THE DISCLOSURE

A solid state calorimeter for measuring power or energy supplied to a load in which the power or energy to be measured is converted into heat includes primary and secondary heat pumps and means for controllably supplying electric currents to each heat pump. The heat-absorbing junctions of the primary and secondary heat pumps are in heat-exchanging relationship with the load and the heat-evolving junction of the primary heat pump, respectively. An electric current responsive to load temperature is supplied to the primary heat pump to maintain the load at a predetermined constant first temperature. An electric current responsive to the temperature of the heat-evolving junction of the primary heat pump, or to the temperature difference between the two junctions of the primary heat pump is supplied to the secondary heat pump to maintain the heat-evolving junction of the primary heat pump at a predetermined constant second temperature which in the general case is unequal to the first temperature and in a special case is equal thereto. The current supplied to the primary heat pump is a measure of the rate that heat is being pumped and thus the rate that energy is being converted into heat at the load.

---

This invention relates to power- and energy-measuring devices which employ the process of solid state heat pumping. This patent application is a continuation-in-part of our copending patent application Ser. No. 98,172, filed Mar. 24, 1961, now abandoned, entitled, "Calorimeter Utilizing Thermoelectric Heat Pump," and assigned to the assignee of this application.

In the past, thermal energy has been measured by detecting a temperature rise in a body to which the energy is applied, or, by detecting a temperature rise in a fluid passing through the body to which the energy is applied. Another known means used for this purpose is the dual body calorimeter in which measurable external power is supplied to a body similar in thermal characteristics to that to be measured to keep the two bodies in thermal equilibrium.

These devices have been subject to a number of inherent disadvantages, such as being of excessive size and weight due to the amount of insulation needed to prevent heat losses. Also, in the dual body calorimeter, it is necessary that absolute thermal isolation exists between the bodies, and, in practice, this becomes quite difficult because thermal loads are usually also excellent thermal conductors. Accordingly, it is an object of this invention to provide a power-and energy-measuring device which is not subject to the above-mentioned inherent defects.

It is another object of this invention to provide a power- and energy-measuring device which is small in size and has no moving parts.

A further object of this invention is to provide a power- and energy-measuring device in which no temperature need be measured.

A still further object of this invention is to provide a power- and energy-measuring device in which improved accuracy of measurement is obtained.

It is another object of this invention to provide a power- and energy-measuring device in which the temperature of the body in which the energy is converted into heat does not change.

It is still a further object of this invention to provide an improved thermal power- and energy-measuring device which utilizes phenomena where heat may be pumped under the impetus of an electrical current, and includes the Peltier effect, the Ettingshausen effect, and the Nernst effect.

It is known that when electric current of a given polarity passes through a junction of two dissimilar materials, a heating or cooling effect will be observed at the junction. This phenomenon is known as the Peltier effect. Devices known as thermoelectric heat pumps have been made which utilize this effect. These thermoelectric heat pumps have a heat-absorbing or "cold" junction and heat-evolving or "hot" junction, with the heat pump serving to transfer heat from the heat-absorbing junction to the heat-evolving junction. It should be noted that the temperature of the heat-absorbing junction is not necessarily lower than that of the heat-evolving junction, but the two junctions may be at the same temperature or the heat-absorbing junction may be maintained at a higher temperature than the heat-evolving junction.

Another principle of heat pumping which may be utilized is that known as the Ettingshausen effect in which a longitudinal temperature gradient is produced by a transverse electric current in a crossed magnetic field.

Finally, another principle known as the Nernst effect can be utilized. In this case a longitudinal electric current produces a longitudinal temperature gradient in a transverse magnetic field.

For the purpose of introduction to the subject invention, a relatively simple device which does not form the present invention will now be briefly described. In this device a single thermoelectric heat pump is maintained with the heat-absorbing junction in heat-exchanging relationship with a load in which supplied energy is converted into heat, with the heat pump being controlled in such a manner as to maintain the load at a constant temperature. The rate that heat is being transferred by the heat pump from the heat-absorbing junction to the heat-evolving junction can be made proportional to the heat being supplied to the load, and a measure of this heat transfer can thus be a measure of the energy being supplied to the load.

However, in the present application as will be explained in more detail hereinafter, in the thermoelectric case the rate of heat transfer by the heat pump from the heat-absorbing junction to the heat-evolving junction is given by an expression containing six variables, viz.; the electrical current passing through the junctions, the absolute temperature of the heat-absorbing junction, the absolute temperature of the heat-evolving junction, and three variables which are dependent on the absolute temperatures of the two junctions. Now, in the most general case, if both the heat-absorbing junction and the heat-evolving junction are maintained at constant temperatures, not necessarily equal, then, of course, the absolute temperatures of the two junctions will be constant and the three temperature-dependent variables will also be constant. In the special case wherein the heat-absorbing junction and heat-evolving junction are maintained at the same constant temperature, the absolute temperature of the heat absorbing junction will be a constant and the temperature differential will be zero. Therefore, in both the general and special cases, the rate of heat transfer from the load to be measured will be a function only of the electric current passing through the junctions of the heat pump, and since electric current can be measured with extreme accuracy, an improved accuracy of measurement of rate of heat transfer is obtained. The term "measure" is defined and used herein to mean the determination of the numerical value of a property in a standard system of units as opposed to a relative and nonquantitative method of ascertaining a property.

In the Ettingshausen and Nernst phenomena a transverse magnetic field parameter contributes one additional variable to the heat-pumping expression. In these cases the intensity of the magnetic flux must also be kept constant to satisfy the condition that the rate of heat pumping be a function only of the pumping current.

The present invention is based on the concept established by the above-described condition wherein the rate of heat transfer (pumping) is a function only of the pumping current.

Briefly stated in accordance with one aspect of this invention, a calorimeter for measuring power or energy being supplied to a load, in which the power or energy to be measured is converted into heat, includes a primary thermoelectric or thermomagnetic heat pump having a heat-absorbing junction and a heat-evolving junction, with the heat-absorbing junction being in heat-exchanging relationship with the load. Electric current of the proper polarity and intensity is supplied to the heat pump (passing through the junctions thereof) to maintain the load and heat-absorbing junction at a predetermined constant temperature. To provide a controllable heat sink a secondary heat pump, of any type, is provided, having its heat-absorbing junction in heat-exchanging relationship with the heat-evolving junction of the primary heat pump. Current of the proper polarity and intensity is supplied to the secondary heat pump to maintain the heat-evolving junction of the primary heat pump at a predetermined constant temperature. The current being supplied to the primary heat pump is measured (or preferably the ammeter is calibrated in units of power at the temperature conditions selected) to provide a measure of the rate that heat is being pumped and, thus, of the rate that energy is being converted into heat at the load.

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings, in which:

Figure 4:
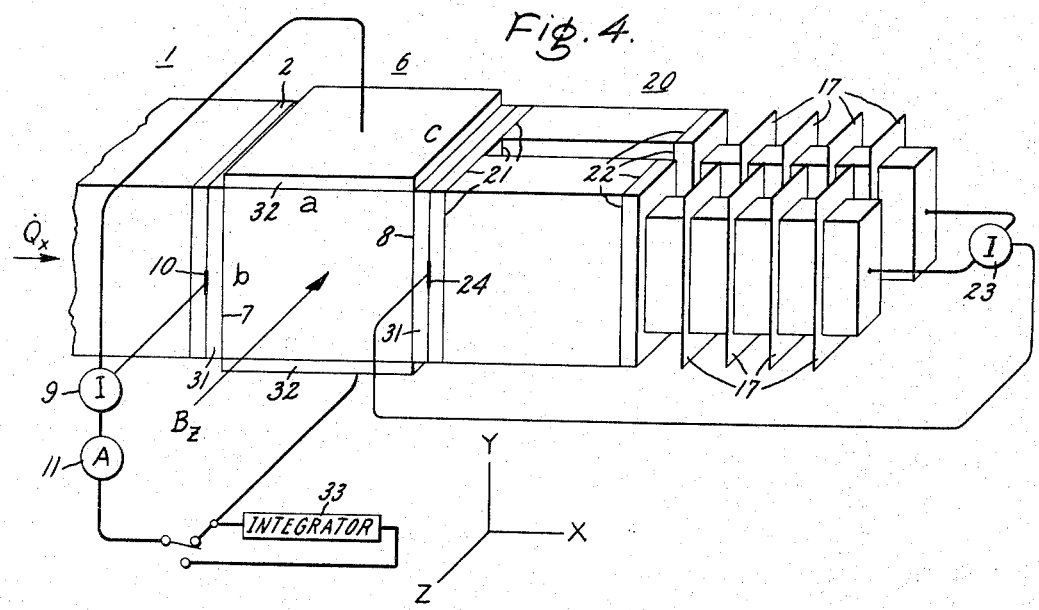
Figure 5:
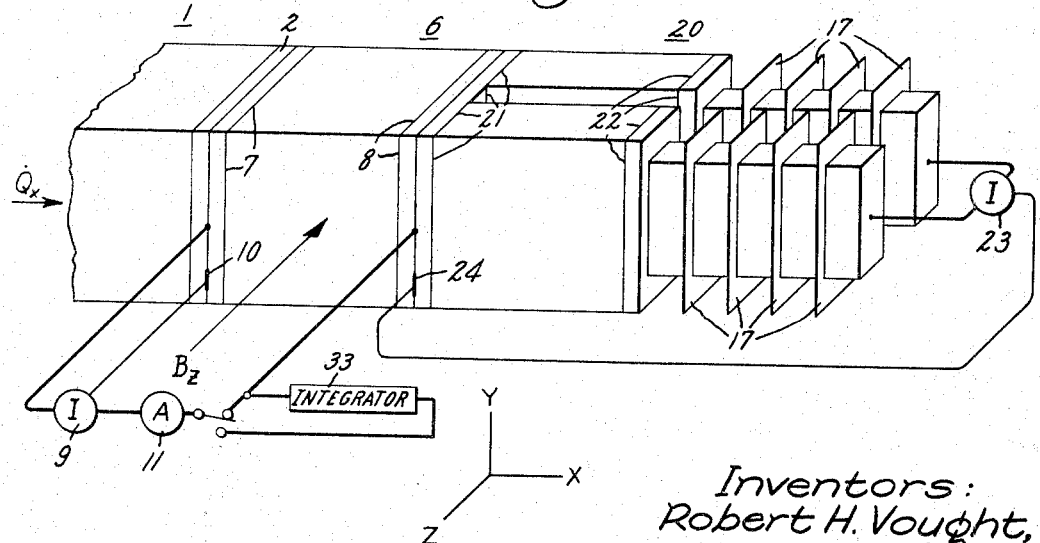

FIGURE 4 is a perspective illustration, partly schematic, of a third embodiment of the invention showing a thermomagnetic heat pump utilizing the Ettingshausen effect and using a thermoelectric heat pump sink at the heat-evolving junction thereof; and FIGURE 5 is a perspective illustration, partly schematic, of a fourth embodiment of the invention showing a thermomagnetic heat pump utilizing the Nernst effect and using a thermoelectric heat pump sink at the heat-evolving junction thereof.

Figure 1:
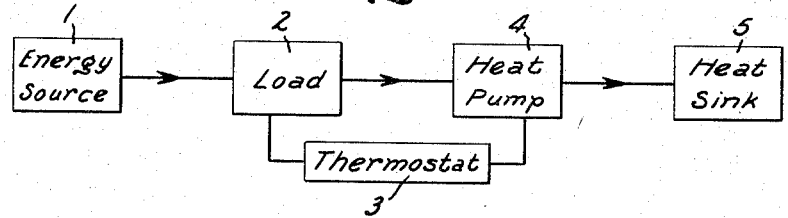
FIGURE 1 is a block diagram useful in understanding the invention.

FIGURE 1 shows the general arrangement of a device described hereinabove for purposes of introduction wherein an energy source 1 supplies energy to a load 2, in which the energy supplied is converted into heat. The resultant rise in temperature of the load 2 is sensed by a thermostat 3 associated with a heat pump 4, which is in heat-exchanging relationship with the load 2. The heat pump 4 removes heat from the load 2 at such a rate as to maintain the load at a constant temperature. The heat from the pump 4 may be dissipated by a heat sink 5 or other convenient means.

Thus, when the load 2 is maintained at a constant temperature, either equal to the temperature of its environment or a constant differential therefrom, the rate of heat being removed by the heat pump 4 is proportional to the power, that is, the rate of energy being supplied by the energy source 1 and absorbed by the load 2, and a measurement of the rate of heat being removed by the heat pump 4 is a measurement of the power, that is, the rate of energy being supplied to the load.

Figure 2:
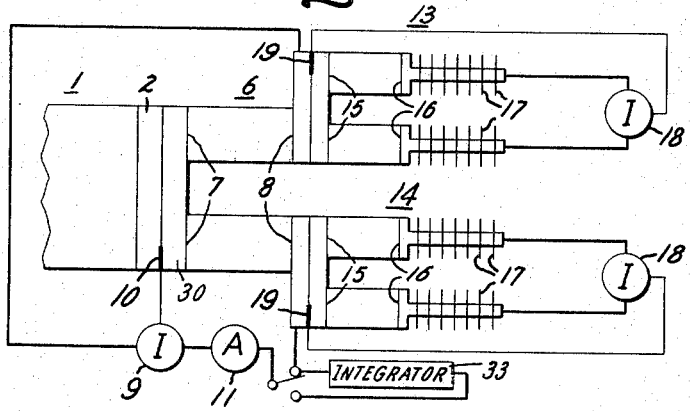
FIGURE 2 is a plan view, partly schematic, of one embodiment of the invention showing a thermoelectric heat pump utilizing the Peltier effect, and using a thermoelectric heat pump sink at each of two sections of the heat-evolving junction thereof.

FIGURE 2 shows, in plan view and partly schematically, one embodiment of the present invention being used in conjunction with a heat-absorbing load 2 to measure the power, that is, the rate of energy being supplied to the load. A primary thermoelectric heat pump 6 utilizing the Peltier effect, which may be of the bismuth telluride-copper type, such as is well known in the art, includes heat-absorbing junctions 7 and heat-evolving junctions 8. In the steady state operation of the invention which will hereinafter be described, a direct current source 9 continuously supplies current of proper polarity to the thermoelectric heat pump 6 to cause the heat pump to transfer heat from the heat-absorbing junctions 7 to the heat-evolving junctions 8.

The thermoelectric heat pump 6 is maintained with its heat-absorbing junctions 7 in heat-exchanging relationship with the load 2. Energy being supplied to the load 2 at a certain rate is converted into heat, which, of course, tends to cause the temperature of the load 2 to increase. This increase in temperature is sensed by a continuously monitoring type of temperature sensory element 10, such as a thermocouple or other suitable proportional-type thermostatic element, and when this temperature increase is sensed, the current source 9 is controlled to supply current of the correct polarity to the thermoelectric heat pump 6. Temperature sensory element 10 may conveniently be in contact with the preferably contacting surfaces of load 2 and the heat pump connecting strap 30 which is constructed from a metal such as copper. A direct current measuring device 11, such as am ammeter, measures the intensity of the current being continuously supplied by the current source 9 to the thermoelectric heat pump 6, which current is just sufficient to maintain the load 2 at a constant predetermined temperature. The intensity of the current supplied by current source 9 may be adjusted either manually or by means of a conventional automatic proportional control circuit to maintain load 2 at the constant predetermined temperature. The current intensity will generally have to be changed when the absorbed power level changes in order to maintain the temperature of load 2 constant.

There is also an essential relationship between the temperature of the load 2 and the temperature of its environment, namely, that these two temperatures need not be equal but that their difference must be held constant. When these two temperatures are maintained equal, substantialy all of the heat supplied to the load 2 from the energy source 1 is delivered to the heat-absorbing junctions 7 of the primary heat pump. When these two temperatures are unequal but constant, a proportional amount of the heat supplied to load 2 from the energy source is delivered to the heat-absorbing junctions 7. Thus, a measure of the rate of heat being transferred from the heat-absorbing junctions 7 to the heat-evolving junctions 8 can be made a measure of the rate of energy being supplied to the load 2.

The net rate of heat transferred by the thermoelectric heat pump 6 from the heat-absorbing junctions 7 to the heat-evolving junctions 8 may be given by the following expression:

$$Q = SIT_c - \tfrac{1}{2} I^2 R - K \Delta T \qquad (1)$$

where Q is the rate of heat transfer, S is the Seebeck coefficient of the thermoelectric material, I is the current being supplied to the thermoelectric heat pump 6, $T_c$ is the absolute temperature of the heat-absorbing junctions, R is the total electrical resistance of the thermoelectric heat pump 6, K is the total thermal conductance of the thermoelectric heat pump 6, and $\Delta T$ is the temperature differential $(T_h-T_c)$ between the heat absorbing junctions 7 and the heat-evolving junctions 8, wherein $T_h$ is the absolute temperature of the heat-evolving junctions. For a particular thermoelectric heat pump, the average values of the quantities S, R, and K are constants for any particular selection of junction temperatures of $T_c$ and $T_h$, and the rate of heat transfer by the pump is a function of the variable quantities I, $T_c$, and $\Delta T$. If, however, the heat-absorbing junctions 7 and the heat-evolving junctions 8 are maintained at constant, but, in general, unequal temperatures, $T_c$ becomes a constant, $\Delta T$ becomes a constant, and Equation 1 can thus be rewritten:

$$\dot{Q}=C_1 I^2 + C_2 I + C_3 \quad (2)$$

where $$C_1 = -\tfrac{1}{2}R$$

$$C_2 = ST_c, \text{ the Peltier coefficient}$$

and $$C_3 = -K\Delta T$$

Thus, it is evident that the net rate of heat transfer, $\dot{Q}$, is a function only of the current I being supplied to the thermoelectric heat pump from the source 9. Further, it should be obvious that in the special case wherein the heat-absorbing junctions 7 and the heat-evolving junctions 8 are maintained at the same constant temperature, that $T_c$ becomes a constant, $\Delta T$ becomes zero, and $\dot{Q}$ is again a function only of current I.

In the present invention, the heat-absorbing junctions 7 and the heat-evolving junctions 8 are maintained at predetermined constant temperatures which in the general case are unequal, and in the special case are equal. The temperature differential $\Delta T = T_h - T_c$ is a constant which can be selected either larger or smaller than zero depending on the power requirements of the application in the general case, and is, of course, zero in the special case. Secondary thermoelectric heat pumps 13 and 14, which may be similar to primary thermoelectric heat pump 6, are provided with heat-absorbing junctions 15 in heat-exchanging relationship with the heat-evolving junctions 8 of the primary thermoelectric heat pump 6. Heat-evolving junctions 16 of the secondary thermoelectric heat pumps 13 and 14 may be maintained in thermal relationship with suitable heat exchangers 17 by means of which the evolved heat may be removed from the system.

Direct current sources 18 provide current of the proper polarity and intensity to the thermoelectric heat pumps 13 and 14. These current sources 18 are controlled by temperature-sensory elements 19, which may again be thermocouples, to sense the temperatures of the heat-evolving junctions 8. Under the control of the temperature-sensory elements 19, the current sources 18 continuously supply just enough current to the secondary thermoelectric heat pumps 13 and 14 to maintain the heat-evolving junctions 8 of thermoelectric heat pump 6 at the predetermined constant temperature $T_h$. In like manner, manual adjustment of current sources 18, or the use of conventional automatic proportional control circuits provide the control of such current sources to thereby maintain junctions 8 at the predetermined constant temperature.

Finally, differential temperature-sensory elements (such as conventional differential thermocouples) may be employed instead of the temperature-sensory elements 19 which sense the temperature of the heat-evolving junctions 8 of the primary heat pump, each differential element having one terminal in contact with the load 2 and the heat-absorbing junctions 7 of the primary heat pump, and the other terminal in contact with the heat-evolving junction 8. In this latter type of circuit arrangement, a galvanometer connected in the differential thermocouple circuit indicates a null in the special case wherein the heat-absorbing junction 7 and heat-evolving junction 8 temperatures, $T_c$ and $T_h$, respectively, are equal. In like manner, the galvanometer indicates a constant nonzero reading in the general case wherein such temperatures are unequal and a constant temperature differential $(T_h-T_c)$ is maintained. Thus, it is evident that in the case of the use of the differential temperature-sensory elements, current sources 18 are controlled in response to the differential temperature $(T_h-T_c)$, that is, in response to the temperatures of the heat-absorbing junction 7 and the heat-evolving junctions 8, as opposed to being responsive to only the heat-evolving junction 8 temperature in the case of the (nondifferential) temperature-sensory elements 19 heretofore described. It should be understood that such differential temperature-sensory element may also be employed in the hereinafter described embodiments.

Figure 3:
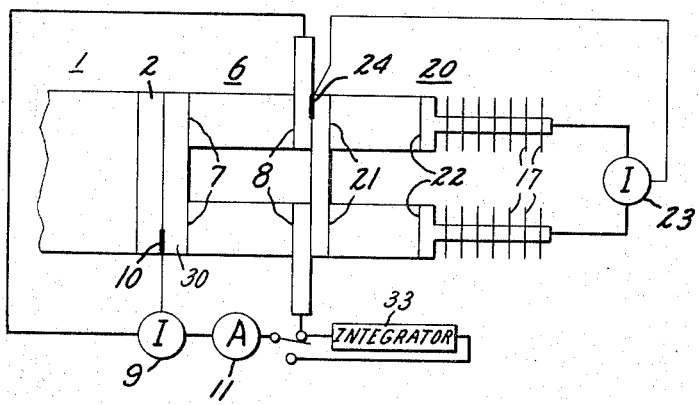
FIGURE 3 is a plan view, partly schematic, of a second embodiment of the invention showing a thermoelectric heat pump utilizing the Peltier effect, and using a single thermoelectric heat pump sink at the two sections of the heat-evolving junction thereof.

FIGURE 3 shows a second embodiment of the invention in which a single secondary thermoelectric heat pump is employed. A secondary heat pump 20 is provided having heat-absorbing junctions 21 which are in heat-exchanging relationship with heat-evolving junctions 8 of a primary thermoelectric heat pump 6. A direct current source 23, under the control of a temperature-sensory element 24, continuously supplies current of the proper polarity and intensity to the secondary thermoelectric heat pump 20.

This second embodiment of the invention differs from that shown in FIGURE 2 only by the elimination of one of the secondary heat-sink pumps on one section of the heat-evolving junction 8 of the primary pump. All the operating components necessary are present to maintaining a constant temperature at the load 2 and at the heat-evolving junctions 8, as well as a constant relationship between the temperature of the load 2 and the ambient temperature.

Thus, it is seen that the rate of heat being transferred by the thermoelectric heat pump 6 from its heat-absorbing junctions 7 to its heat-evolving junctions 8, which is proportional to the rate of energy being supplied to the load 2 and converted to heat therein, is a function solely of the intensity of the current being supplied by the current source 9 to the thermoelectric heat pump 6, and that the intensity of this current may be measured by the current-measuring device 11. The current-measuring device 11 may be calibrated in units of current, from which the rate of heat transfer may be calculated, or it may be calibrated directly in units of power. Calibration of the ammeter in terms of power is valid for one particular set of values of $T_h$ and $T_c$ since the parameters S, R, and K are temperature dependent.

It should be mentioned here for the purpose of generality that it is possible to determine the power input by actually measuring the pumping current in amperes and the other parameters S, R, K, $T_c$, and $T_h$ in suitable units in order to calculate the rate of heat transfer. However, this calculation will represent the rate at which energy is being supplied to the load only insofar as the percentage losses in heat transfer between the source and the load and between the load and its environment are known. The avoidance of this difficult loss determination as well as the elimination of the complicated parameter measurements are good reasons for stressing the desirability of calibrating the ammeter in terms of power. Not only does this technique bypass a number of critical measurements but it can be made as precise as is necessary to meet the requirements of the application.

FIGURE 4 shows, in perspective view and partly schematically, a third embodiment of the invention in which a primary heat pump 6 is of the thermomagnetic type utilizing the Ettingshausen effect. In this phenomenon an electric current in a transverse constant magnetic field produces a temperature gradient which is transverse to both the electric current and the magnetic field. As in the thermoelectric heat pump, the power or energy to be measured is supplied to a load 2 in which the energy is converted to heat. The load is in heat-exchanging relationship with a heat-absorbing junction 7 of thermomagnetic heat pump 6.

A direct-current source 9, under the control of temperature sensory element 10, continuously supplies current of proper polarity and intensity to the heat pump 6 to cause the heat pump to transfer heat, by the Ettingshausen effect, from the heat-absorbing junction 7 to a heat-evolving junction 8 while maintaining the temperature of the heat-absorbing junction constant. The heat thus transferred to the heat-evolving junction 8 is dissipated to a heat sink 20 (in this case of the thermoelectric type), which is capable of controlling the temperature of the heat-evolving junction 8. A direct current source 23 under the control of a temperature sensory element 24 continuously supplies current of the proper polarity and intensity to a secondary thermoelectric heat pump 20 to maintain the heat-evolving junction 8 at a predetermined constant temperature, which, as in the thermoelectric cases, is not equal to the constant temperature of the heat-absorbing junction 7 in the general case. Heat-evolving junctions 22 of secondary thermoelectric heat pump 20 may be maintained in thermal relationship with suitable heat exchangers 17 by means of which the evolved heat may be removed from the system.

The net rate of heat transferred by the thermomagnetic pump 6 from the heat-absorbing junction 7 to the heat-evolving junction 8 may be given by the following expression:

$$\dot{Q}_x = \frac{E_y}{\rho_{yy}} \alpha_{yx} T_c - \frac{1}{2} \frac{E_y^2 a}{\rho_{yy}} - (1 - Z_{yx}\bar{T}) K_{xx} \frac{\Delta T}{a} \quad (3)$$

where $E_y$=applied electric field
$\rho_{yy}$=electrical resistivity in the $y$-direction
$K_{xx}$=thermal conductivity in the $x$-direction
$\alpha_{yx}$=thermomagnetic power=$B_z N_{yx}$ where $N_{yx}$, the Nernst coefficient, is a property of the material and $B_z$ is the magnitude of the magnetic flux in the $z$-direction $Z_{yx}$=thermomagnetic figure of merit=$\dfrac{\alpha^2_{yx}}{\rho_{yy}K_{xx}}$ $T_h$=absolute temperature of heat-evolving junction
$T_c$=absolute temperature of heat-absorbing junction
$\Delta T = T_h - T_c$ $$\bar{T} = \frac{(T_h + T_c)}{2}$$

$a$=dimension of primary heat pump in the $x$ direction

The parameters $\rho_{yy}$, $K_{xx}$ and $\alpha_{yx}$ are temperature dependent and in this case also dependent on the magnitude of the magnetic flux.

Consequently, to establish the values of these parameters constant for a particular heat pump, the temperature, $T_c$, of the heat-absorbing junction 7, the temperature, $T_h$, of the heat-evolving junction 8, and magnetic flux, $B_z$, are maintained constant.

Equation 3 can then be rewritten:

$$\dot{Q}_x = C_4 E_y - C_5 E_y^2 - C_6 \quad (4)$$

where $$C_4 = \frac{\alpha_{yx} T_c}{\rho_{yy}}$$

$$C_5 = \frac{1}{2} \frac{a}{\rho_{yy}}$$

and $$C_6 = (1 - Z_{yx}\bar{T}) K_{xx} \frac{\Delta T}{a}$$

It is evident that the net rate of heat transfer, $Q_x$, is a function only of the applied electric field, $E_y$. In general the thermomagnetic heat pump is a constant electric field device whereas the thermoelectric heat pump is a constant current device.

However, it is the electric current which is being measured, or calibrated in terms of power, and it remains to demonstrate a functionality between $E_y$ and the current, $I_y$, indicated by the ammeter 11.

The current, $I_y$, obtained by averaging the current density over the cross-section of the element is given by $$I_y = \frac{E_y}{\rho_{yy}} ac + \frac{\alpha_{yx}}{\rho_{yy}} \Delta T c \quad (5)$$

where $c$ is the dimension of the thermomagnetic heat pump 6 in the $z$ direction.

Since $\rho_{yy}$, $\alpha_{yx}$, and $\Delta T$ are constants under the operating conditions imposed on the device, Equation 5 can be rewritten $$I_y = C_7 E_y + C_8 \quad (6)$$

where $$C_7 = \frac{ac}{\rho_{yy}}$$

and $$C_8 = \frac{\alpha_{yx}}{\rho_{yy}} \Delta T c$$

and, thus $$E_y = \frac{I_y - C_8}{C_7} \quad (7)$$

Substituting Equation 7 in Equation 4 gives $$\dot{Q}_x = C_4 \frac{I_y - C_8}{C_7} - C_5 \frac{I_y^2 - 2C_8 I_y + C_8^2}{C_7^2} - C_6 \quad (8)$$

By combining the constants and rearranging the terms, this equation can be made to assume the same form as the functional relationship in the thermoelectric case, Equation 2:

$$\dot{Q}_x = C_9 I_y^2 + C_{10} I_y + C_{11} \quad (9)$$

where $$C_9 = -\frac{C_5}{C_7^2}$$

$$C_{10} = \frac{C_4}{C_7} + 2\frac{C_5}{C_7^2} C_8$$

and $$C_{11} = -\left[\frac{C_4}{C_7} C_8 + \frac{C_5}{C_7^2} C_8^2 + C_6\right]$$

and it is evident that owing to the functional relationship between $I_y$ and $E_y$ when all other parameters are constant, the net rate of heat transfer, $Q_x$, can be considered a function only of the current $I_y$ being supplied to the thermomagnetic heat pump 6 from the energy source 1. In the special case wherein the temperatures of heat-absorbing junction 7 and heat-evolving junction 8 are equal, the $C_{11}$ term in Equation 9 is zero.

It should be mentioned in connection with the application of this third embodiment of the invention that it differs also from the thermoelectric heat pump configuration in that the longitudinal temperature gradient (in the $x$ direction) will tend to be thermally shorted by the electrodes 32 between the heat-absorbing junction 7 and the heat-evolving junction 8. The effect of the thermal shorting is considerably reduced by elongating the thermomagnetic heat pump 6 in the $b$ direction. In addition, the heat leakage along the current leads acts as an unknown heat load on the device. In the special case wherein $T_h = T_c$ and the temperature of the load 2 is maintained equal to the temperature of the ambient, the longitudinal temperature gradients will be reduced to zero, as will the temperature gradient along the leads, so that heat leakage will also be reduced to zero. Finally, electrical shorting of the thermomagnetic heat pump 6 is substantially avoided by constructing thermal contacts 31 of a suitable high thermal conductivity and high electrical resistivity material such as alumina or beryllia. Electrodes 32 are constructed of a suitable low electrical resistivity material such as copper.

FIGURE 5 shows a fourth embodiment of the invention in which a primary heat pump 6 is of the thermomagnetic type utilizing the Nernst effect. As employed herein, a longitudinal electrical current in a transverse constant magnetic field gives rise to a longitudinal temperature gradient, that is, the direction of the electric current and the direction of heat flow in the primary heat pump are collinear. This terminology (Nernst effect) is complicated by the common use of the term to refer to the Ettingshausen-Nernst effect wherein a transverse electric field is produced by a longitudinal temperature gradient in a crossed magnetic field. The Nernst effect also differs from another heat pump phenomenon known as the magnetically enhanced Peltier effect in which a magnetic field is also applied transverse to the longitudinal electric current and temperature gradient, one of the distinctions being that in the Nernst effect the particular direction of the magnetic field determines the direction of heat flow whereas in the magnetically enhanced Peltier effect the heat flow direction is determined by the direction of the electric current and the only limitation on the magnetic field is that it be applied along an axis transverse to the longitudinal electric current. As in both the Peltier thermoelectric and Ettingshausen thermomagnetic heat pump devices, the power or energy to be measured is supplied to a load 2 in which the energy is converted into heat. The load is in heat-exchanging relationship with a heat-absorbing junction 7. A direct current source 9 under the control of temperature-sensory element 10, continuously supplies current of proper polarity and intensity to the primary heat pump 6 to cause the heat pump to transfer heat by the Nernst effect from the heat-absorbing junction 7 to a heat-evolving junction 8 while maintaining the temperature of the heat-absorbing junction 7 constant. The heat thus transferred to the heat-evolving junction 8 is dissipated to a heat sink 20 (in this case of the thermoelectric type) which is capable of controlling the temperature of the heat-evolving junction 8. A direct current source 23 under the control of a temperature-sensory element 24 continuously supplies current of the proper polarity and intensity to a secondary thermoelectric heat pump 20 to maintain the heat-evolving junction 8 at a predetermined constant temperature, which, in the general case, is not equal to the constant temperature of the heat-absorbing junction 7. Suitable heat exchangers 17 may also be employed to remove the evolved heat from the system.

The net heat transferred by the primary heat pump 6 from the heat-absorbing junction 7 to the heat-evolving junction 8 is given by an expression analogous to those discussed in detail under the Peltier and Ettingshausen effects. When the temperature, $T_c$, of the heat-absorbing junction 7, the temperature, $T_h$, of the heat-evolving junction 8, and the magnitude of the magnetic field, $B_z$, are all maintained constant for any one calibration or series of measurements of the input power, $\dot{Q}$ in terms of pumping current, I, then the relationship between $\dot{Q}$ and I can be reduced to the form $$\dot{Q}_x = C'I^2 + C''I + C'''$$

Thus, it is evident that the net rate of heat transfer, $\dot{Q}_x$, is a function only of the current, I, being supplied to the thermomagnetic heat pump 6 from the energy source 1.

If it is desired to measure the total amount of energy which has been supplied to the load 2, rather than to measure the power, suitable integrating means 33 may be used in conjunction with the current-measuring device 11 in each of the above-described four embodiments to indicate the total amount of energy which has been supplied to the load. As one example of a suitable integrating means, the following circuit may be employed. An electronic circuit for establishing the correlation between the current I supplied to the primary heat pump 6 and the net rate of heat transfer $\dot{Q}$ (heat input to the primary heat pump) is required. Since the relationship between $\dot{Q}$ and I has been shown to be the equation of a parabola (in the general case, $\dot{Q} = C_1I^2 + C_2I + C_3$), a nonlinear amplifier is used to convert an input voltage (proportional to current I) to a current proportional to the square of this input voltage, a linear amplifier is used to provide a component of current proportional to current I, and a D.C. value of current is used to provide a component of current representing the constant term $C_3$. These three components of current, properly proportioned are fed into a conventional operational amplifier. The composite output of the operational amplifier provides a current proportional to the heat pumping rate. This current operates an ampere-hour meter to give a measure of the energy which has been supplied to the load. The power measuring instrument (calibrated ammeter 11) could also be operated by this current, thus eliminating the need for a non-linear scale calibration of the ammeter when it is connected directly into the primary heat pumping current circuit.

While four embodiments of the invention have been disclosed and described, it is obviously not limited to these particular arrangements. Many modifications may become apparent to those skilled in the art which will lie within the scope of the invention. For example, the invention is not limited to the use of additional thermoelectric heat pumps to maintain the heat-evolving junctions of the primary heat pump at constant temperature; other suitable means for obtaining this result fall within the spirit and scope of the invention. Also, the invention is not limited to the particular form of heat pumps shown, but any suitable thermoelectric or thermomagnetic heat pump may be utilized. For example, it is well known to those skilled in the art that in certain temperature ranges the thermoelectric properties of some materials can be enhanced by the proper application of a magnetic field. Such magnetically enhanced Peltier heat pumps are also construed to fall within the purview of this invention. Thus, the invention is to be limited only by the scope and spirit of the appended claims.

What we claim as new and desire to secure by Letters Patent of the United States is:

1. A device for measuring power being supplied to a load in which the power to be measured is converted into heat comprising a heat pump having a heat-absorbing junction and a heat-evolving junction, said heat-absorbing junction being in heat-exchanging relationship with the load, means responsive to the temperature of the load to control the amount of heat being pumped by said heat pump to maintain the load at a predetermined constant temperature, means for maintaining said heat-absorbing junction and said heat-evolving junction at predetermined constant temperatures, and means for measuring the heat pumped by said heat pump whereby a measurement of the power converted into heat by the load is obtained.

2. A device for measuring power being supplied to a load in which the power to be measured is converted into heat comprising a heat pump having a heat-absorbing junction and a heat-evolving junction, said heat-absorbing junction being in heat-exchanging relationship with the load, means responsive to the temperature of the load to control the amount of heat being pumped by said heat pump to maintain the load at a predetermined constant temperature, means for maintaining the temperature of said heat-evolving junction equal to the temperature of said heat-absorbing junction, and means for measuring the heat pumped by said heat pump whereby a measurement of the power converted into heat by the load is obtained.

3. A device for measuring power being supplied to a load in which the power to be measured is converted into heat comprising a heat pump having a heat-absorbing junction and a heat-evolving junction, said heat-absorbing junction being in heat-exchanging relationship with the load, means for maintaining said heat-absorbing junction and said heat-evolving junction at predetermined constant temperatures, means for supplying electric current to said heat pump, means responsive to the temperature of the load to control the amount of current being supplied to said heat pump to maintain the load at the predetermined constant temperature of said heat-absorbing junction, and means for measuring the current being supplied to said heat pump whereby a measurement of the power being converted into heat by the load is obtained.

4. A device according to claim 3 in which said means for maintaining said heat-absorbing junction and said heat-evolving junction at predetermined constant temperatures comprises at least one additional heat pump.

5. A device for measuring power being supplied to a load in which the power to be measured is converted into heat comprising a heat pump having a heat-absorbing junction and a heat-evolving junction, said heat-absorbing junction being in heat-exchanging relationship with the load, means for maintaining said heat-absorbing junction and said heat-evolving junction at an equal predetermined constant temperature, means for supplying electric current to said heat pump, means responsive to the temperature of the load to control the amount of current being supplied to said heat pump to maintain the load at the predetermined constant temperature, and means for measuring the current being supplied to said heat pump whereby a measurement of the power being converted into heat by the load is obtained.

6. A device for measuring power being supplied to a load in which the power to be measured is converted into heat comprising a primary thermoelectric heat pump having a first heat-absorbing junction and a first heat-evolving junction, said first heat-absorbing junction being in heat-exchanging relationship with the load, means for supplying electric current to said primary thermoelectric heat pump, means responsive to the temperature of the load to control the amount of current being supplied to said primary thermoelectric heat pump to maintain the load at a predetermined constant temperature, a secondary heat pump having a second heat-absorbing junction and a second heat-evolving junction, said second heat-absorbing junction being in heat-exchanging relationship with said first heat-evolving junction, means for supplying electric current to said secondary heat pump, means responsive to the temperatures of said first heat-absorbing junction and said first heat-evolving junction to control the amount of current being supplied to said secondary heat pump to maintain a predetermined constant temperature difference between said first heat-absorbing junction and said first heat-evolving junction, and means for measuring the current being supplied to said primary thermoelectric heat pump whereby a measurement of the power being converted to heat by the load is obtained.

7. A device according to claim 6 in which said predetermined constant temperature difference is not equal to zero.

8. A device according to claim 6 in which said predetermined constant temperature difference is equal to zero.

9. A device for measuring power being supplied to a load in which the power to be measured is converted into heat comprising a primary thermoelectric heat pump having at least one heat-absorbing junction and at least one heat-evolving junction, each of said heat-absorbing junctions being in heat-exchanging relationship with the load, means for supplying electric current to said primary thermoelectric heat pump, means responsive to the temperature of the load to control the amount of current being supplied to said primary thermoelectric heat pump to maintain the load at a predetermined constant temperature.

at least one additional secondary thermoelectric heat pump, each having at least one heat-absorbing junction and said one heat-evolving junction, each of the heat-evolving junctions of said primary thermoelectric heat pump being in heat-exchanging relationship with at least one of the heat-absorbing junctions of said additional secondary thermoelectric heat pumps, means for supplying electric current to each one of said additional secondary thermoelectric heat pumps, means responsive to the temperature of each one of said heat-absorbing junctions and of each one of said heat-evolving junctions of said primary thermoelectric heat pump to control the amount of current being supplied to each one of the additional secondary thermoelectric heat pumps having a heat-absorbing junction in heat-exchanging relationship therewith to maintain a predetermined constant temperature difference between each said heat-absorbing junction and each said heat-evolving junction of said primary thermoelectric heat pump, and means for measuring the current being supplied to said primary thermoelectric heat pump whereby a measurement of the power being converted into heat by the load is obtained.

10. A device according to claim 9 in which said predetermined constant temperature difference is not equal to zero.

11. A device according to claim 9 in which said predetermined constant temperature difference is equal to zero.

12. A device for measuring power being supplied to a load in which the power to be measured is converted into heat comprising a thermomagnetic heat pump having a heat-absorbing junction and a heat-evolving junction, said heat-absorbing junction being in heat-exchanging relationship with the load, means for maintaining said heat-absorbing junction and said heat-evolving junction at a predetermined constant temperature difference, means for supplying electric current to said thermomagnetic heat pump, means responsive to the temperature of the load to control the amount of current being supplied to said thermomagnetic heat pump to maintain the load at the predetermined constant temperature of said heat-absorbing junction, means for supplying a transverse magnetic field to said thermomagnetic heat pump, and means for measuring the current being supplied to said thermomagnetic heat pump whereby a measurement of the power being converted into heat by the load is obtained.

13. A device according to claim 12 in which said means for maintaining said heat-absorbing junction and said heat-evolving junction at a predetermined constant temperature difference comprises a thermoelectric heat pump.

14. A device for measuring power being supplied to a load in which the power to be measured is converted into heat comprising
a primary thermomagnetic heat pump having a first heat-absorbing junction and a first heat-evolving junction, said first heat-absorbing junction being in heat-exchanging relationship with the load,
means for supplying electric current to said primary thermomagnetic heat pump in a direction transverse to the direction of heat flow within said thermomagnetic heat pump,
means responsive to the temperature of the load to control the amount of current being supplied to said primary thermomagnetic heat pump to maintain the load at a predetermined constant temperature,
a secondary thermoelectric heat pump having a second heat-absorbing junction and a second heat-evolving junction, said second heat-absorbing junction being in heat-exchanging relationship with said first heat-evolving junction,
means for supplying electric current to said secondary thermoelectric heat pump,
means responsive to the temperatures of said first heat-absorbing junction and of said first heat-evolving junction to control the amount of current being supplied to said secondary thermoelectric heat pump to maintain a predetermined constant temperature difference between said first heat-absorbing junction and said first heat-evolving junction,
means for supplying a magnetic field to said primary thermomagnetic heat pump in a direction transverse to both the direction of heat flow within said thermomagnetic heat pump and the direction of the electric current supplied thereto, and
means for measuring the current being supplied to said primary thermomagnetic heat pump whereby a measurement of the power being converted to heat by the load is obtained.

15. A device for measuring power being supplied to a load in which the power to be measured is converted into heat comprising
a primary thermomagnetic heat pump having a first heat-absorbing junction and a first heat-evolving junction, said first heat-absorbing junction being in heat-exchanging relationship with the load,
means for supplying electric current to said primary thermomagnetic heat pump in a direction collinear to the direction of heat flow within said thermomagnetic heat pump,
means responsive to the temperature of the load to control the amount of current being supplied to said primary thermomagnetic heat pump to maintain the load at a predetermined constant temperature,
a secondary thermoelectric heat pump having a second heat-absorbing junction and a second heat-evolving junction, said second heat-absorbing junction being in heat-exchanging relationship with said first heat-evolving junction,
means for supplying electric current to said secondary thermoelectric heat pump,
means responsive to the temperatures of said first heat-absorbing junction and of said first heat-evolving junction to control the amount of current being supplied to said secondary thermoelectric heat pump to maintain a predetermined constant temperature difference between said first heat-adsorbing junction and said first heat-evolving junction,
means for supplying a magnetic field to said primary thermomagnetic heat pump in a direction transverse to the direction of heat flow within said thermomagnetic heat pump, and
means for measuring the current being supplied to said primary thermomagnetic heat pump whereby a measurement of the power being converted to heat by the load is obtained.

16. A device according to claim 3 and further comprising integrating means connected in circuit relationship with said current measuring means whereby a measurement of the energy converted into heat by the load is obtained.

17. A device according to claim 12 and further comprising integrating means connected in circuit relationship with said current measuring means whereby a measurement of the energy converted into heat by the load is obtained.

18. A device according to claim 12 in which said predetermined constant temperature difference is not equal to zero.

19. A device according to claim 12 in which said predetermined constant temperature difference is equal to zero.

20. A device for measuring power being supplied to a load in which the power to be measured is converted into heat comprising
a primary thermoelectric heat pump having a first heat-absorbing junction and a first heat-evolving junction, said first heat-absorbing junction being in heat-exchanging relationship with the load,
means for supplying electric current to said primary thermoelectric heat pump,
means responsive to the temperature of the load to control the amount of current being supplied to said primary thermoelectric heat pump to maintain the load at a first predetermined constant temperature,
a secondary heat pump having a second heat-absorbing junction and a second heat-evolving junction, said second heat-absorbing junction being in heat-exchanging relationship with said first heat-evolving junction,
means for supplying electric current to said secondary heat pump,
means responsive to the temperature of said first heat-evolving junction to control the amount of current being supplied to said secondary heat pump to maintain said first heat-evolving junction at a second predetermined constant temperature, and
means for measuring the current being supplied to said primary thermoelectric heat pump whereby a measurement of the power being converted to heat by the load is obtained.

References Cited
UNITED STATES PATENTS
3,170,117   2/1965   Brening et al. _____ 324—106

OTHER REFERENCES
Wolfe, R.: "Magnetothermoelectricity," Scientific American, June 1964, pp. 70, 71, 72, 73, 74, 75, 76, 78, 79, 80, and 82.

RUDOLPH V. ROLINEC, *Primary Examiner.*

ARCHIE R. BORCHELT, *Examiner.*

E. F. KARLSEN, *Assistant Examiner.*